United States Patent [19]

Chiu et al.

[11] Patent Number: 5,752,022
[45] Date of Patent: May 12, 1998

US005752022A

[54] METHOD FOR CREATING A HYPERTEXT LANGUAGE FOR A DISTRIBUTED COMPUTER NETWORK

[75] Inventors: Suet Mui Chiu, San Jose; Michael Jon Dockter, Hollister; Joel Frank Farber, San Jose; Michael Leon Pauser, Morgan Hill; Randal James Richardt, San Jose, all of Calif.

[73] Assignee: International Business Machines Corp., Armonk, N.Y.

[21] Appl. No.: 512,205

[22] Filed: Aug. 7, 1995

[51] Int. Cl.[6] ............................................. G06F 17/30
[52] U.S. Cl. ........................ 395/610; 707/104; 707/513; 395/200.31
[58] Field of Search ............................. 395/610, 615, 395/752, 762, 774, 200.03

[56] References Cited

U.S. PATENT DOCUMENTS 5,530,852  6/1996  Meske, Jr. et al. ............... 395/610
5,557,720  9/1996  Brown, Jr. et al. ............... 395/774
5,557,722  9/1996  DeRose et al. .................. 395/774
5,629,846  5/1997  Crapo ............................. 364/785

*Primary Examiner*—Paul R. Lintz
*Attorney, Agent, or Firm*—Randy W. Lacasse; David J. Kappos; Marilyn S. Dawkins

[57] ABSTRACT

A server-based application intercepts an initial request for access to documents which may contain imbedded references to linked information. A request is made from the server to the actual location of the requested document as it is found on a network (e.g. WORLD-WIDE WEB, INTERNET, etc.). The document is retrieved into the server and parsed to discover all imbedded addresses contained therein. The server then replaces each imbedded address with its own address plus the original imbedded address such that all future references to the imbedded information will be supplied by the server. Additional linking information, functions and/or environment escape information may then be prepended and/or postpended to the requested document independently through the server.

18 Claims, 3 Drawing Sheets

METHOD FOR CREATING A HYPERTEXT LANGUAGE FOR A DISTRIBUTED COMPUTER NETWORK

BACKGROUND OF THE INVENTION

1. Field of Invention

The present invention relates generally to the field of document retrieval and interaction on a distributed computer network. More specifically, the present invention relates to a system for post processing imbedded links in a hypertext mark-up language (HTML) for application on the INTERNET.

2. Related Materials and Definitions

This application is related to the following co-pending applications which are hereby incorporated by reference:

METHOD FOR GENERATING CONNECTIONS BETWEEN OBJECTS IN A COMPUTER NETWORK (Grinding) (application Ser. No. 08/262,999), now U.S. Pat. No. 5,608,900

METHOD FOR THE ASSOCIATION OF HETEROGENEOUS INFORMATION (application Ser. No. 08/262,838pending), FACILITY FOR THE STORAGE AND MANAGEMENT OF CONNECTIONS (CONNECTION SERVER) (application 08/267,022), now abandoned and continued in application Ser. No. 08/741,291, Oct. 30, 1996.

The following definitions may be helpful in the understanding of the terminology as cited throughout the above related materials. This terminology may be used throughout the background, specification and claims of the present invention:

SGML: Standard Generalized Markup Language(ISO standard 88791)—scripting language in which computer systems on the WORLD-WIDE WEB can express output. The term SGML can be interchanged with any references to HTML throughout the disclosure.

HTML: Hypertext Mark-up Language—scripting language in which computer systems on the WORLD-WIDE WEB can express output.

URLs: Uniform Resource Locators—addresses defined in HTML.

Prepend: Data connected to the beginning of an object.

Postpend: Data connected at the end of an object.

DISCUSSION OF PRIOR ART

The WORLD-WIDE WEB is a tool for locating, accessing and communicating data, including computerized text, images and other information throughout the world. The WORLD-WIDE WEB may be broadly described as a virtual collection of documents with a user being able to access and retrieve these documents through existing telephone and/or data lines.

Documents accessible on the WORLD-WIDE WEB can have the capability to point to other documents on the web using linking information imbedded in the text itself. Typically the documents are in a HTML format which subscribes to a definition of a tagging architecture.

Hypertext linking occurs by an active method of authorship by a person and/or machine. The author will integrate references directly into the text of a document which point to other related items of information. These references are frequently referred to as uniform resource locators (URLs) which provide a way of converting the integrated reference to a real location where the related information will be located on the INTERNET.

A document, typically ASCII text, is viewable by commercially known browsers e.g. WebExplorer (IBM), Netscape, Mosaic (NCSA), Lynx, Cello, etc. Each of the browsers use the same language (HTML) and are therefore compatible with any computer maker's environment to produce a method of seeing the same result.

A user "surfing" the web will open documents with items of interest highlighted. These highlighted text portions possess the reference links to other additionally related information as originally linked by the author. The user, through use of a pointing cursor (e.g. mouse), may click on the highlighted text and be transferred to the additional related information through an invisible process of recognizing the linking information (e.g. URLs) and transferring to the appropriate address on the web. The entire process takes place without intelligence input from the user other than a selection of highlighted information.

FIG. 1 illustrates a block diagram of existing WORLD-WIDE WEB data linking. A user 101 inputs a request 102 for a particular document or other piece of information. The request is sent through normal WORLD-WIDE WEB 103 interfaces (e.g. WebExplorer, etc.) to search, locate and retrieve the requested document. Once the document, as shown in exploded view 105, is retrieved the user may select highlighted text 106 which may be of further interest. The highlighted text, in HTML format, includes hidden imbedded links 107 to other related information 108/109 as prepared by hypertext authoring tools. Upon selecting a highlighted text section, the system will retrieve the related data through the Web and return it to the user in much the same manner as the process for obtaining the original request.

One very limiting factor in obtaining a series of linked information exists in the way that the original document was authored. The author of an original document places a series of pointers to other information that the author believed to be important at the time of the preparation of that document. In a worldwide system and over time, it is conceivable that what is relevant related information to the originating author may not be relevant to a user of a differing point of view. In addition, at a time later than the original preparation of the document, other types of information may become more relevant. A system may want to link other ideas or information to the document that is being viewed other than those submitted by the author.

Attempts have been made in the prior art to provide for an environment that could allow post document intelligence adding. A prior art method referred to as a "proxy server" has attempted to act as a go-between from a request for a specific connection to a specific imbedded link. This method suffers from a requirement of adding a layer of hardware and software to the linking process and cannot provide a directed and controlled linking method.

At the present time the prior art systems have failed to recognize a method for allowing post-authoring linking or appending of additional information to documents or other selections of information available on the WORLD-WIDE WEB.

SUMMARY OF THE INVENTION

It is an object of the present invention to provide a method of post processing of imbedded hypertext links.

It is also an object of the present invention to provide an application of the above method as it applies to a distributed computer network.

It is also an object of the present invention to provide a layer of address transformation software on the WORLD-WIDE WEB.

It is also an object to make the present invention appear transparent to both the user and the distributed computer network.

These and other objects of the invention will become evident when taken in conjunction with the drawings, claims and description of the preferred embodiments of the invention.

The present invention includes a server-based application which intercepts an initial request for access to documents which may contain imbedded references to linked information. A request is made from the server to the actual location of the requested document as it is found on a network (e.g. WORLD-WIDE WEB, INTERNET, etc.). The document is retrieved into the server and parsed to discover all imbedded addresses contained therein. The server then replaces each imbedded address with its own address plus the original imbedded address such that all future references to the imbedded information will be supplied by the server. Additional linking information, functions and/or environment escape information may then be prepended and/or post-pended to the requested document independently through the server.

The process of retrieving documents and linked information appears to the user to be identical to existing retrieval methods. The server's interaction with the document is transparent to the user and allows for them to remain in a single environment without having to repetitiously request access to the server itself.

DESCRIPTION OF THE PREFERRED EMBODIMENTS

Figure 1:
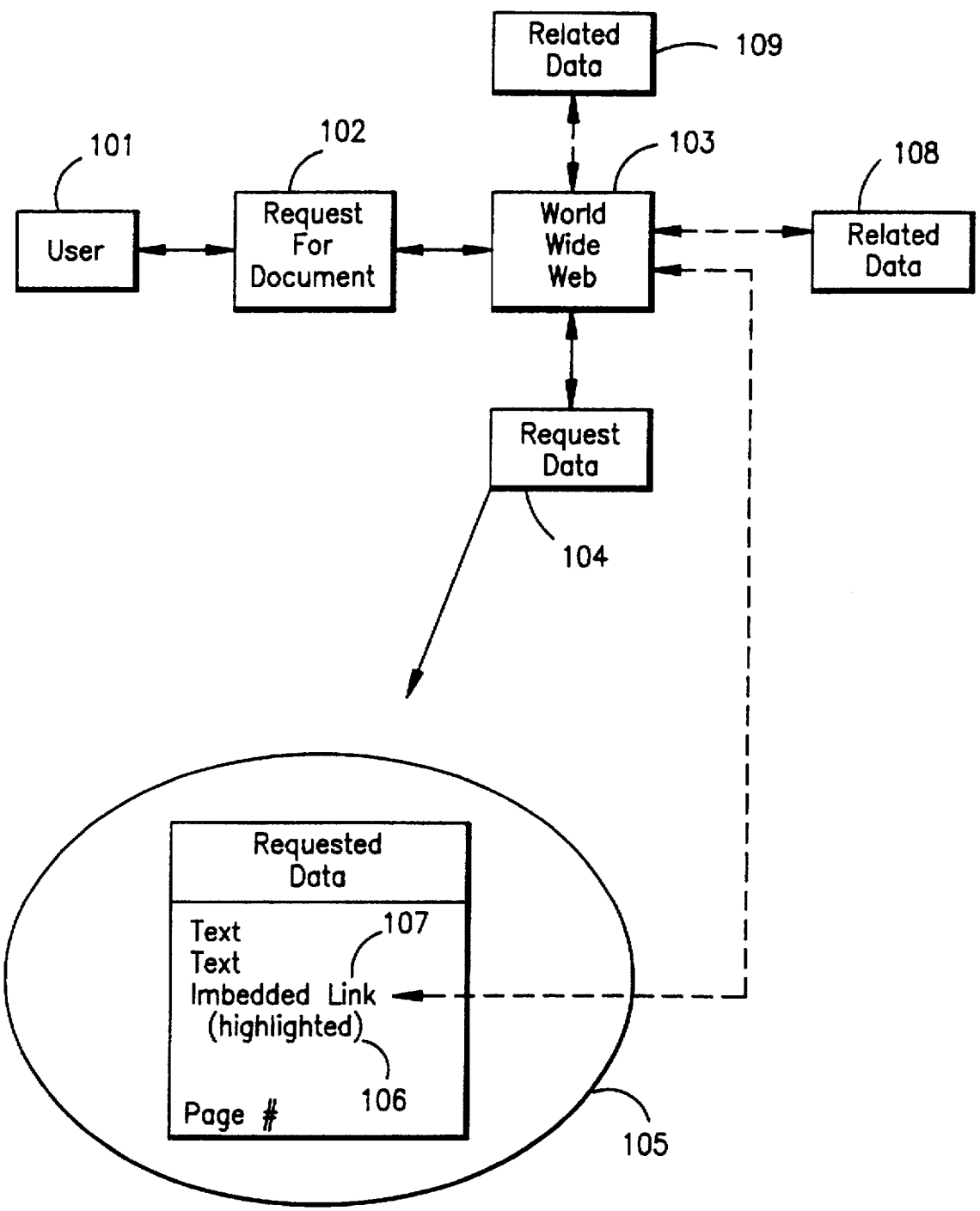
FIG. 1 illustrates a basic prior art INTERNET hypertext link.
Figure 2:
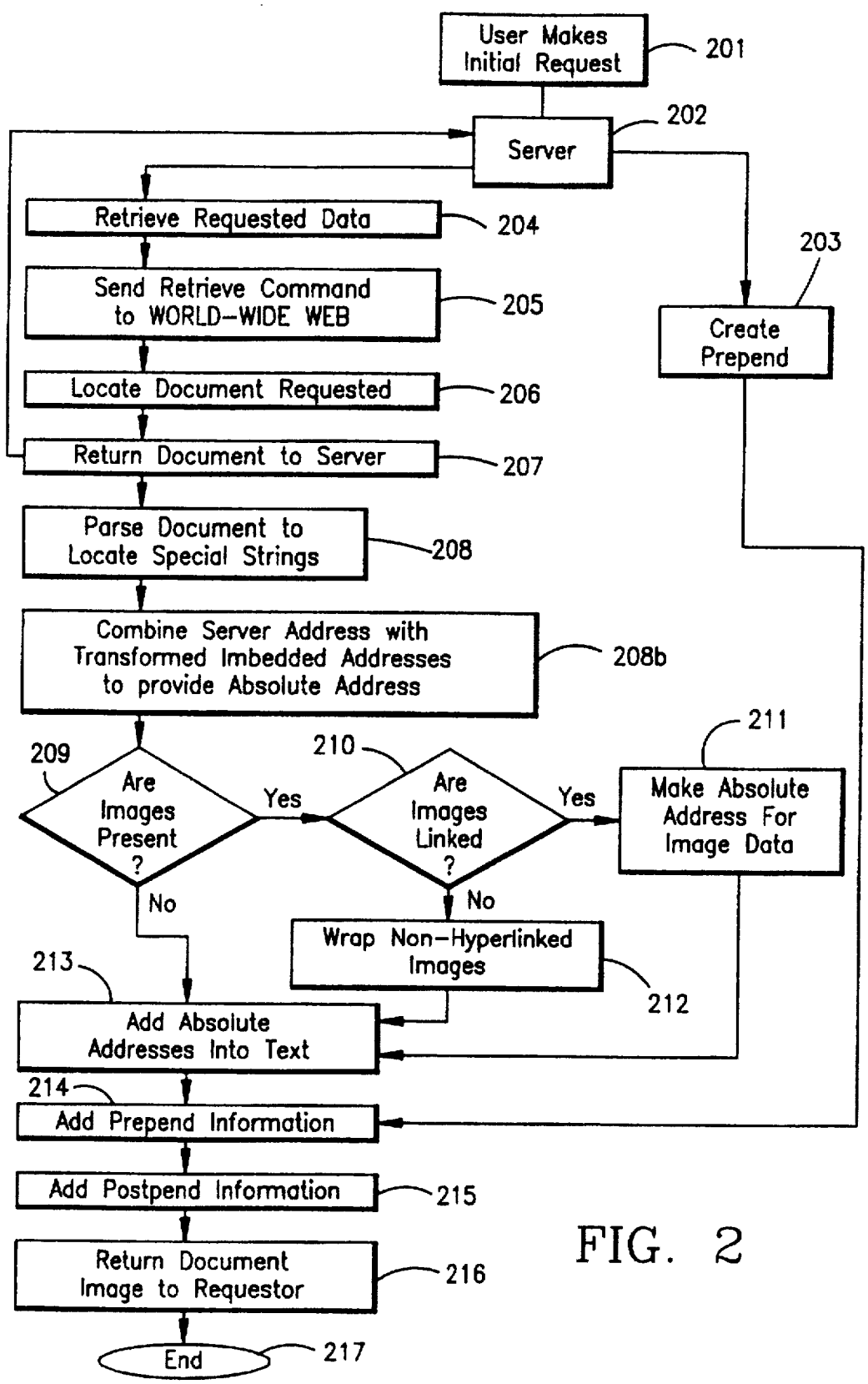
FIG. 2 illustrates a flow diagram of the present invention.

FIG. 2 illustrates a flow diagram of the elemental steps of the invention.

step 1 is initial request from the user. The user sends a stream of information 201 to a server 202 requesting a unit of information from a location within the network. An example of a typical format would be:

http://knuaqui.stl.ibm.com/cgi-bin/aquiFetch.cmd?url=http://www.yahoo.com&u=aUserid&p=aPassword step 2

"fetch" step 1 create a prepend 203 which is written in HTML language step 3

"fetch" step 2 forward the request 204 of the "actual" page to an existing commercially available network retrieval system 205 to locate 206 and retrieve the requested information into the server 207.

receive the page into a file located within the server step 4

"fetch" step 3 reads received file and initiates parsing 208 looking for particular strings which indicate start/end points of documents, imbedded information (href strings-URLs), etc.

change a variable (x) where x represents a location of imbedded information to a function of x where x=f(x), the function being what is performed by the server, via text replacement. Text replacement occurs when an imbedded string is wrapped(combined) with the address of the server 208b. The following is an example of an imbedded string with the original and new strings shown:

Original: a href= http://www.xyz.com/
New: a href=http://knuaqui.stl.ibm.com/cgi-bin/aquiProcessFetch.cmd?url=http://www.xyz.com/&u=useid&password In summary, step 4, abstracts out all of the intermediate links that are assumed when on the web and plugging those particular ones in so that server can get back there at a later time. By extracting this information the server changes relative addresses, i.e. how one piece of data sequences to another piece of data, to an absolute address 213 of that information.

step 5

Fetch step 3 cont'd—special case (images)

The system determines if any images are present in the document 209 and then determines if they are hypertext links 210. GIF files(linked images)do not get connection information (wrapping) because the server does not retrieve the actual hypertext linked images. In order to make the page look like it would normally to the user, the actual location of the image data must be recognized as relative data but be represented by an absolute address 211. The following is an example of an original and new image address:

Original: <img src=/art/art.gif>
New: <img src=http://www.yahoo.com/art/art.gif>

In the alternative, the system can wrap non-hyperlinked (aka non-clickable) images 212 to create hyperlinks which will be given an absolute address 213. Example:

Original: a href= /bin/there IMG ismap width=500 height=70 border=0 hspace=0 src= /images/main.gif /a
New: a href= http://knuaqui.stl.ibm.com/cgi-bin/aquiProcessFetch.cmd?url=http://www.xyz.com/bin/there/-images/main.gif&u=userid&p=password IMG ismap width=500 height=70 border=0 hspace=0 src=http//www.xyz.com/bin/there/images/main.gif /a step 6 (post-pend 215) "fetch" step 4 add "connection information"—See related co-pending applications, incorporated by reference, for the actual process of generating connections.

An aspect of the preferred embodiment is that information can be retrieved from yet another server.

step 7 send newly-assembled HTML document to requester 216

Figure 3:
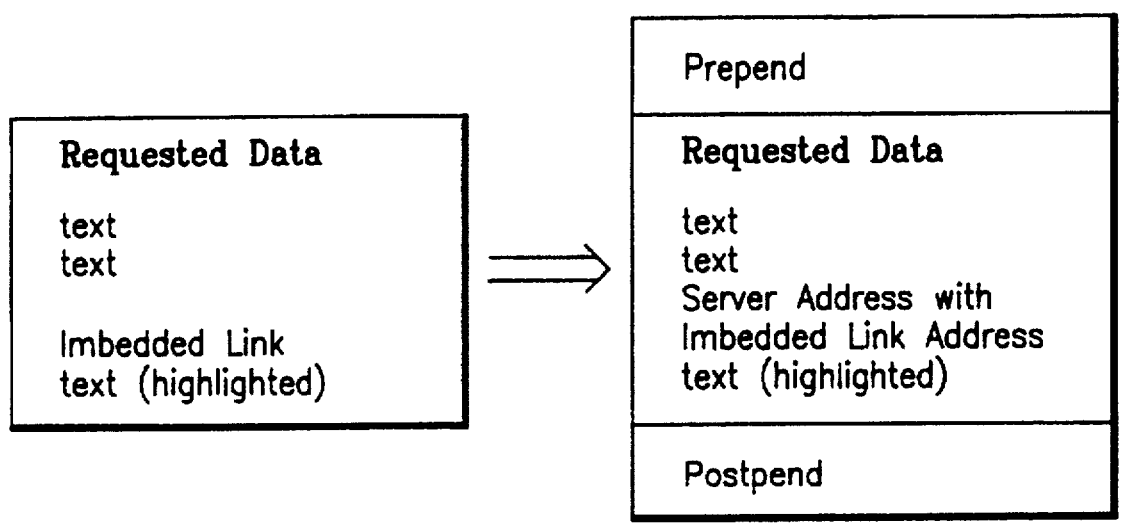
FIG. 3 illustrates a typical example using the present invention.

As shown in FIG. 3, when the requested document comes back to the requester they will see the appended data. Their document will now look visually different from the requested page, in that, they will see prepend information, then the actual page(without a change in appearance) will follow and then the postpend. What will be invisible to the user is that all of the link information has changed. The user has the option of interacting with the screen in traditional ways by clicking on hypertext items and going further into the web or by adding additional connections.

Because of the absolute addressing transferring linked information to the server, an environment has been created which allows the user to author new hypertext links or append other functions. Once in the requesting mode, the user will be able to remain in the server environment until he/she chooses to exit the mode.

CONCLUSION

A system and method has been shown in the above embodiments for the effective implementation of a method for creating hypertext language for the INTERNET, wherein an environment is created allowing user initiated post-document authoring. While various preferred embodiments have been shown and described, it will be understood that there is no intent to limit the invention by such disclosure, but rather, it is intended to cover all modifications and alternate constructions falling within the spirit and scope of the invention as defined in the appended claims.

The present invention should not be limited to a specific application on INTERNET or WORLD-WIDE WEB. The invention could operate equally well on equivalent networking environments including locally manifested environments. In addition, the invention should not be limited by the particular order of the steps of prepend, retrieval of information and postpend.

We claim:

1. A system for processing existing hypertext links in a computerized network comprising:
    a server which intercepts a first document request before it reaches said computerized network and generates a second request;
    a filter which searches for imbedded strings in a document returned to said server pursuant to said second request;
    an address modifying function to operatively connect an address of said server to said imbedded strings;
    an appending function to append data to said document;
    a transferring function which transmits said document with its appended data and modified imbedded strings to complete said first request, and
    wherein said returned document appears to a requester unmodified but retains said appended data.

2. A system for processing existing hypertext links in a computerized network as per claim 1, wherein said network is the INTERNET.

3. A system for processing existing hypertext links in a computerized network as per claim 1, wherein said network is the WORLD-WIDE WEB.

4. A system for processing existing hypertext links in a computerized network as per claim 1, wherein said appended data includes a prepend section before the document and a postpend section after said document.

5. A system for processing existing hypertext links in a computerized network as per claim 1, wherein said appended data may be obtained without requiring additional knowledge from an originating requester.

6. A system for processing existing hypertext links in a computerized network as per claim 1, wherein said server's interception of said first request is transparent to both an originator of said first request and the network to which it is associated.

7. An article of manufacture comprising a computer user medium having computer readable program code embodied therein which processes existing hypertext links on a computerized network comprising:
    computer readable program code which causes a computer server to intercept a first request for a document before it reaches said computerized network and generates a second request;
    computer readable program code which causes said computer server to search for imbedded strings in a document returned to said server pursuant to said second request;
    computer readable program code which causes said computer server to replace an address of said imbedded string with an absolute address comprising both the address of said server and said address of said imbedded string;
    computer readable program code which causes said computer server to append data to said document;
    computer readable program code which causes said computer server to transfer said requested document with its appended data and replaced addresses to complete said first request, and wherein said returned document appears to a requester unmodified but retains the appended data.

8. An article of manufacture comprising a computer user medium having computer readable program code embodied therein which processes existing hypertext links on a computerized network as per claim 7, wherein said network is defined as the INTERNET.

9. An article of manufacture comprising a computer user medium having computer readable program code embodied therein which processes existing hypertext links on a computerized network as per claim 7, wherein said network is defined as the WORLD-WIDE WEB.

10. An article of manufacture comprising a computer user medium having computer readable program code embodied therein which processes existing hypertext links on a computerized network as per claim 7, wherein said appended data includes a prepend section before the document and a postpend section after said document.

11. An article of manufacture comprising a computer user medium having computer readable program code embodied therein which processes existing hypertext links on a computerized network as per claim 7, wherein said appended data may be obtained without requiring additional knowledge from an originator of said requested document.

12. An article of manufacture comprising a computer user medium having computer readable program code embodied therein which processes existing hypertext links on a computerized network as per claim 7, wherein said server's interception of said first request is transparent to both an originator of said first request and the network to which it is associated.

13. A computer program product usable with a programmable computer having computer readable program code embodied therein which processes existing hypertext links on a computerized network comprising:
    computer readable program code which causes a computer server to intercept a first request for a document located on a distributed computer network before it reaches said network;
    computer readable program code which causes said computer server to process said request and direct the requested document to be returned to the server;
    computer readable program code which causes said computer server to search said document for imbedded strings;
    computer readable program code which causes said computer server to replace an address of said imbedded string with an absolute address comprising both the address of said server and said address of said imbedded string;
    computer readable program code which causes said computer server to append data to said document;

computer readable program code which causes said computer server to transfer said requested document with its appended data and replaced addresses to complete said first request, and wherein said returned document appears to a requester unmodified but retains the appended data.

14. A computer program product usable with a programmable computer having computer readable program code embodied therein which processes existing hypertext links on a computerized network as per claim 13, wherein said network is defined as the INTERNET.

15. A computer program product usable with a programmable computer having computer readable program code embodied therein which processes existing hypertext links on a computerized network as per claim 13, wherein said network is defined as the WORLD-WIDE WEB.

16. A computer program product usable with a programmable computer having computer readable program code embodied therein which processes existing hypertext links on a computerized network as per claim 13, wherein said appended data includes a prepend section before the document and a postpend section after said document.

17. A computer program product usable with a programmable computer having computer readable program code embodied therein which processes existing hypertext links on a computerized network as per claim 13, wherein said appended data may be obtained without requiring additional knowledge from an originator of said requested document.

18. A computer program product usable with a programmable computer having computer readable program code embodied therein which processes existing hypertext links on a computerized network as per claim 13, wherein said server—s interception of said first request is both transparent to an originator of said first request as well as the network to which it is associated.

* * * * *

UNITED STATES PATENT AND TRADEMARK OFFICE
CERTIFICATE OF CORRECTION

PATENT NO. : 5,752,022
DATED : May 12, 1998
INVENTOR(S) : Chiu et al.

It is certified that error appears in the above-indentified patent and that said Letters Patent is hereby corrected as shown below:

IN THE DISCUSSION OF PRIOR ART

Column 2, Line 21, after "information" insert - - 104 - -.

IN THE CONCLUSION

Column 8, line 15, correct "server--s" to - - server's - -.

Signed and Sealed this

Twenty-ninth Day of September, 1998

*Attest:*

BRUCE LEHMAN

*Attesting Officer*          *Commissioner of Patents and Trademarks*